(12) United States Patent
Umeda et al.

(10) Patent No.: US 8,053,915 B2
(45) Date of Patent: Nov. 8, 2011

(54) ON-VEHICLE ROTARY ELECTRIC MACHINE OPERATING ON TWO MODES OF RECTIFICATION

(75) Inventors: Atsushi Umeda, Okazaki (JP); Takatoshi Inokuchi, Kariya (JP)

(73) Assignee: Denso Corporation, Kariya (JP)

( * ) Notice: Subject to any disclaimer, the term of this patent is extended or adjusted under 35 U.S.C. 154(b) by 454 days.

(21) Appl. No.: 12/230,495

(22) Filed: Aug. 29, 2008

(65) Prior Publication Data

US 2009/0058087 A1 Mar. 5, 2009

(30) Foreign Application Priority Data

Aug. 31, 2007 (JP) ................................. 2007-225748

(51) Int. Cl.
 H02P 9/00 (2006.01)
 H02K 23/52 (2006.01)
(52) U.S. Cl. ................................. 290/7; 290/45; 322/44
(58) Field of Classification Search ...................... 290/46
 See application file for complete search history.

(56) References Cited

U.S. PATENT DOCUMENTS

| | | | |
|---|---|---|---|
| 4,701,692 A | 10/1987 | Takeuchi et al. | |
| 5,491,622 A | 2/1996 | Carosa | |
| 7,026,774 B2 * | 4/2006 | Inaba et al. | 318/400.33 |
| 7,471,004 B2 * | 12/2008 | Kanazawa et al. | 290/40 B |
| 7,498,777 B2 * | 3/2009 | Andrieux | 322/45 |
| 2003/0075997 A1 | 4/2003 | Keim et al. | |
| 2003/0155893 A1 | 8/2003 | Schreiber | |
| 2005/0040716 A1 * | 2/2005 | Schmid et al. | 310/71 |
| 2005/0093521 A1 * | 5/2005 | Nishimura et al. | 322/32 |
| 2006/0022623 A1 * | 2/2006 | Inaba et al. | 318/254 |
| 2007/0086226 A1 | 4/2007 | Mavier et al. | |
| 2009/0243522 A1 * | 10/2009 | Suhama et al. | 318/376 |
| 2010/0019734 A1 * | 1/2010 | Oyobe et al. | 320/162 |

FOREIGN PATENT DOCUMENTS

| | | |
|---|---|---|
| EP | 1424764 A2 * | 6/2004 |
| JP | A-01-283090 | 11/1989 |
| JP | A-04-088900 | 3/1992 |
| JP | 11069741 A * | 3/1999 |
| JP | A-2003-284386 | 10/2003 |
| JP | A 2006-174606 | 6/2006 |
| JP | A-2007-099066 | 4/2007 |
| KR | 10-2006-0008372 | 1/2006 |

OTHER PUBLICATIONS

Japanese Office Action issued in JP 2007-225748 on Jul. 14, 2009 with translation.
European Search Report issued in corresponding European Application No. 08015236.6, mailed Aug. 30, 2010.

* cited by examiner

Primary Examiner — Joseph Waks
(74) Attorney, Agent, or Firm — Oliff & Berridge, PLC

(57) ABSTRACT

A rotary electric machine for a vehicle includes a rotor, a stator and a rectifying device for current AC/DC conversion. The machine operates as a motor and a generator. The machine includes a multi-phase windings, switching elements forming a rectifying device, and a controller for controlling a current path of the multi-phase windings by switching the switching elements on and off to perform two modes of operation. The switching elements are switched such that one end of each windings is connected to either a high electrical potential end or a low electrical potential end of the rectifying device and the other ends of the windings connected together to be the same electrical potential are connected to either the high electrical potential end or the low electrical potential end in the rectifying device.

10 Claims, 8 Drawing Sheets

ON-VEHICLE ROTARY ELECTRIC MACHINE OPERATING ON TWO MODES OF RECTIFICATION

CROSS-REFERENCE TO RELATED APPLICATION

This application is related to Japanese Patent Application NO. 2007-225748 filed on Aug. 31, 2007, the contents of which are hereby incorporated by reference.

BACKGROUND OF THE INVENTION

1. Field of the Invention

The present invention relates to a rotary electric machine mounted on a vehicle, and in particular, to the rotary electric machine having a rotor and a stator equipped with multi-phase windings for making the machine function as a motor and a generator.

2. Description of the Related Art

In recent years, some vehicles have a function for stopping the idle rotation (i.e., idling) of the engine for saving consumption of fuel. In such vehicles, the engine is frequently turned off every time and started up every time the vehicle stops. Because the stop and start-up of the engine is repeated, it is desired that a generator mounted on the vehicle be motor-driven and serves as a starter which has a problem regarding the life of brushes incorporated in the starter. In these vehicles, important parameters necessary when quickly starting the engine are a start-up torque having no rotation and a predetermined torque at which the rotation increases to a value equivalent to the idle rotation.

It is desired that fluctuations in the engine-rotation can be stabilized by supplying torque from the generator to the engine. Thus, the generator is required to be motor-driven while the engine rotation can become unstable due to unexpected disturbance of torque of the engine. In these vehicles, motor torque is also required to be generated at least at the level of idle rotation.

In general, the vehicle generator is designed to supply required power at an idle rotation of about 1500 rpm. When the vehicle generator is designed in this way, the revolution speed at which extraction of a generated power current becomes possible is about 1000 rpm.

When the vehicle generator is motor-driven, a voltage suitable for charging the battery is generated at a revolution speed of 1000 rpm. Therefore, electric current cannot be sent from the battery during motor operation. Hence, a sufficient torque cannot be generated at the revolution speed.

Figure 1:
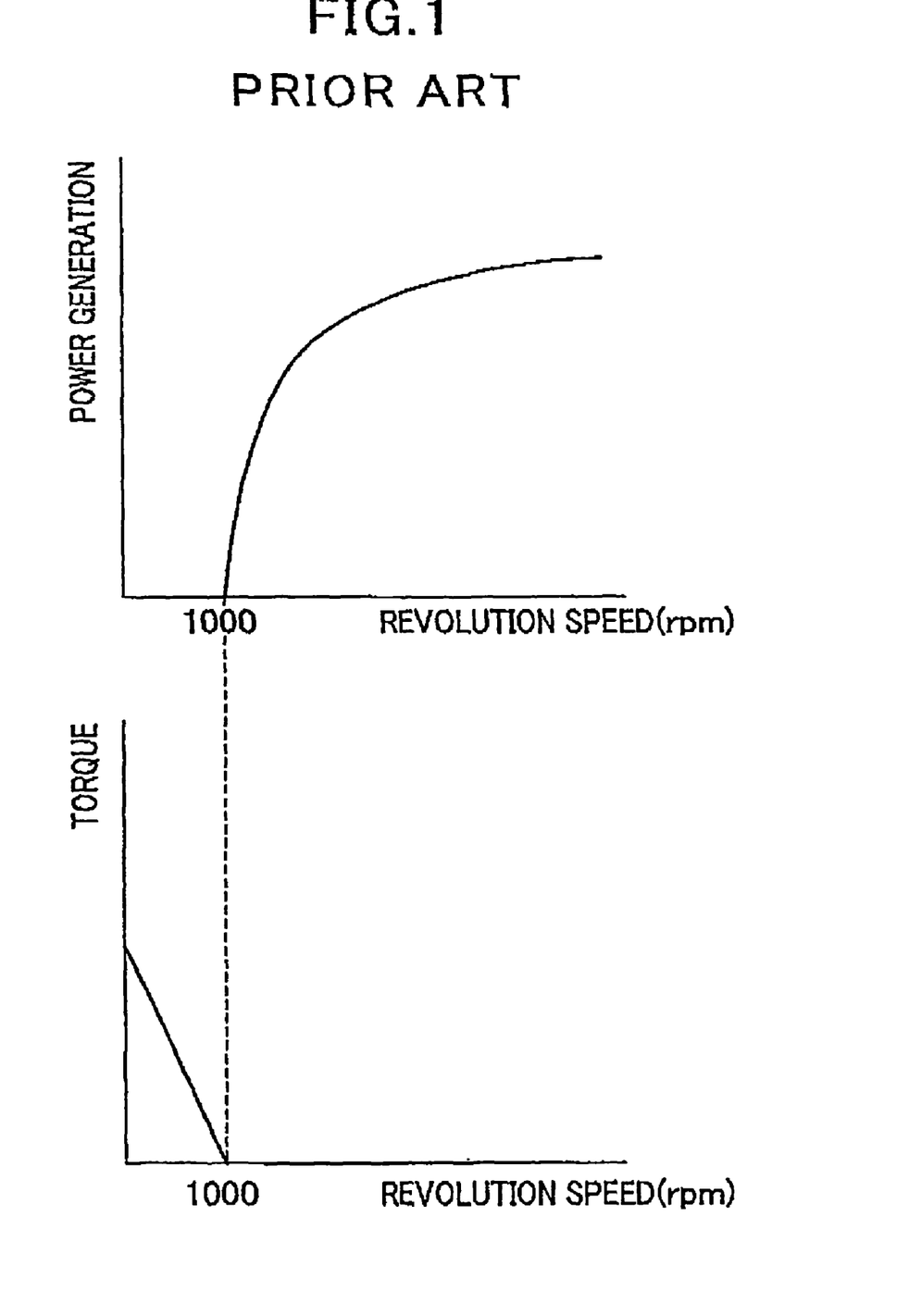
FIG. 1 is a diagram showing characteristics of a conventional vehicle generator

As shown in FIG. 1, the torque decreases linearly from a non-rotation start-up torque to a power generation starting revolution speed. Although some torque can be extracted through weakening current-flowing in the field winding of the generator, the torque is not sufficient for the purpose described above.

Figure 2:
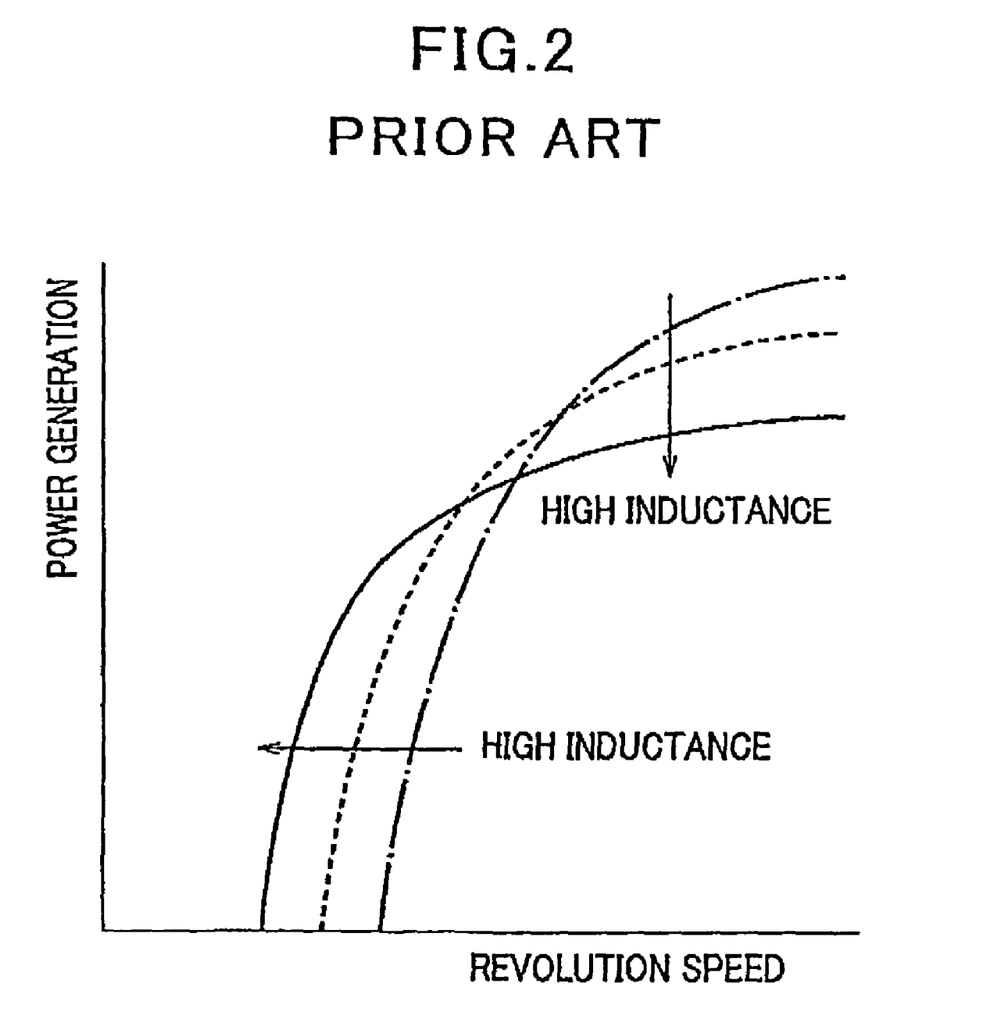
FIG. 2 is a diagram showing a relationship between inductance and power generation in the conventional vehicle generator.

Characteristics of a synchronous rotary machine such as that above are determined by an inductance of a stator, specifically, the number of windings in a stator winding. As shown in FIG. 2, in power generation characteristics, the minimum revolution speed required for initiating the power generation changes depending on the amount of the inductance (the number of windings), and torque and revolution characteristics during motor-driving also change in accompaniment.

In a vehicle rotary machine having both power generation and engine driving functions, it is difficult to actualize the characteristics required during power generation and the characteristics required for torque of the engine with the same inductance. A conflicting request is made in that, when the power generation characteristics are given priority, motor characteristics become a state in which the drive torque is insufficient. When the motor characteristics are given priority, the power generation output during idle rotation becomes insufficient.

As a conventional technology responding to such requests, a series-parallel conversion rotary electric machine in Japanese Patent Laid-open Publication No. Heisei 4-88900 is known. The series-parallel conversion rotary electric machine provides two sets of stator windings and changes impedance by switching the stator windings between serial and parallel. In another conventional technology, a rotary electric machine is known in which switching elements are disposed at a neutral point and between a high potential and a low potential of a Y-connected three-phase winding in the rotary electric machine. When an abnormality, such as disconnection, occurs in the three-phase winding, the rotary electric machine uses the neutral point in place of the winding of the phase at which the abnormality has occurred.

In the series-parallel conversion rotary electrical machine disclosed in Japanese Patent Laid-open Publication No. Heisei 4-88900, a plurality of sets of multi-phase windings are required to be mounted in the stator. Problems occur in that a configuration of the stator becomes complicated and cost rises. A large number of switching elements for switching the winding between serial and parallel is additionally required. For example, compared to six rectifying elements ordinarily required, nine switching elements are additionally required, thereby also contributing to the increase in cost.

In addition, the rotary electric device disclosed in Japanese Patent Laid-open Publication No. 2007-99066 is a technology used only during motor-driving and in response to an abnormal situation, and does not meet the above-described requirements. A conventional three-phase winding is driven by only a two-phase winding and three phases are imitated by use of the neutral point. Problems occur such as the rotation not being smooth.

SUMMARY OF THE INVENTION

The present invention has been achieved in light of the above-described issues. An object of the present invention is to provide a vehicle rotary electric machine that can enable size reduction, high output, and high efficiency during power generation and high torque during motor-driving at a low cost.

To solve the above-described issues, the vehicle rotary electric machine includes a rotor, a stator and a rectifying device that converts current between an alternating current and a direct current in the rotary electric machine. This vehicle rotary electric machine operates as a motor and a generator on the vehicle, comprising a multi-phase windings wounded in the stator; a plurality of switching elements electrically connected to the multi-phase windings to form the rectifying device; and a controller for controlling current path of the multi-phase windings by switching the switching elements on and off to perform two modes of rectifying operation, the switching elements are switched such that one end of each windings is connected to either a high electrical potential end or a low electrical potential end of the rectifying device and the other ends of the windings that are connected together at the same electrical potential are connected to either the high electrical potential end or the low electrical potential end in the rectifying device.

When the multi-phase winding is connected by Y-connection, an electrical current always flows to two phases when ordinary rectification is performed. The inductance becomes a geometric sum. In the present invention, the neutral point rectification mode is provided in which rectification is performed through use of a switch corresponding to the neutral point on an electric potential side differing from the high-side (i.e., higher electrical potential side) and low-side (i.e., lower electrical potential side) winding end switching elements. Therefore, in the neutral point rectification mode, the electrical current enters and exits from the neutral point, and only flows through the winding of one phase. Therefore, the inductance is only that of a winding of a single phase. In other words, a low-inductance winding can be achieved. In the present invention, the control device can arbitrarily switch between two control modes. As a result, the control device can change the inductance using the same three-phase winding. Therefore, only a single set of three-phase windings is required. Size reduction, high output, and high efficiency can be obtained during power generation and high torque can be actualized during motor-driving (motor operation) at a low cost. Because characteristics can be arbitrarily changed by the control mode being switched, optimal power generation characteristics or motor torque characteristics can be achieved at any given time.

The above-described control device switches between the multi-phase full-wave rectification mode and the neutral point rectification mode depending on a revolution speed of the rotor. As a result of the control mode being switched depending on the revolution speed, a control program can be simplified. In addition, because the power generation characteristics and the motor torque characteristics are dependent on the revolution speed, more favorable characteristics can be achieved.

The above-described control device switches to the multi-phase full-wave rectification mode when the revolution speed is slower than a predetermined revolution speed and to the neutral point rectification mode when the revolution speed is faster than the predetermined revolution speed. As a result, during power generation, inductance of the stator can be increased to enhance power generating capability when the revolution speed is slower than the predetermined revolution speed. On the other hand, when the revolution speed is faster than the predetermined revolution speed, the inductance can be reduced. Reaction can be reduced and a high output can be achieved. During motor-driving, a high torque can be achieved to reduce the inductance when the revolution speed is faster than the predetermined revolution speed.

The above-described control device switches between the multi-phase full-wave rectification mode and the neutral point rectification mode depending on whether operation is performed as the motor or as the generator. In a conventional configuration, it is difficult to achieve favorable characteristics during power generation and motor-driving. However, the inductance can be equivalently changed in the present invention. Therefore, favorable characteristics can be achieved both during power generation and during motor-driving.

The above-described rectification control device switches to the multi-phase full-wave rectification mode when operation is performed as the generator and to the neutral point rectification mode when operation is performed as the motor. As a result, during power generation, a high output can be achieved even at a low-speed revolution. During motor-driving, the inductance can be equivalently reduced. Therefore, simultaneous power generation and motor-driving, which was difficult in a vehicle generator, can be obtained.

DETAILED DESCRIPTION OF THE PREFERRED EMBODIMENTS

A vehicle rotary electric machine according to an embodiment to which the present invention is applied will be described in detail with reference to the drawings FIGS. 3 to 9.

Figure 3:
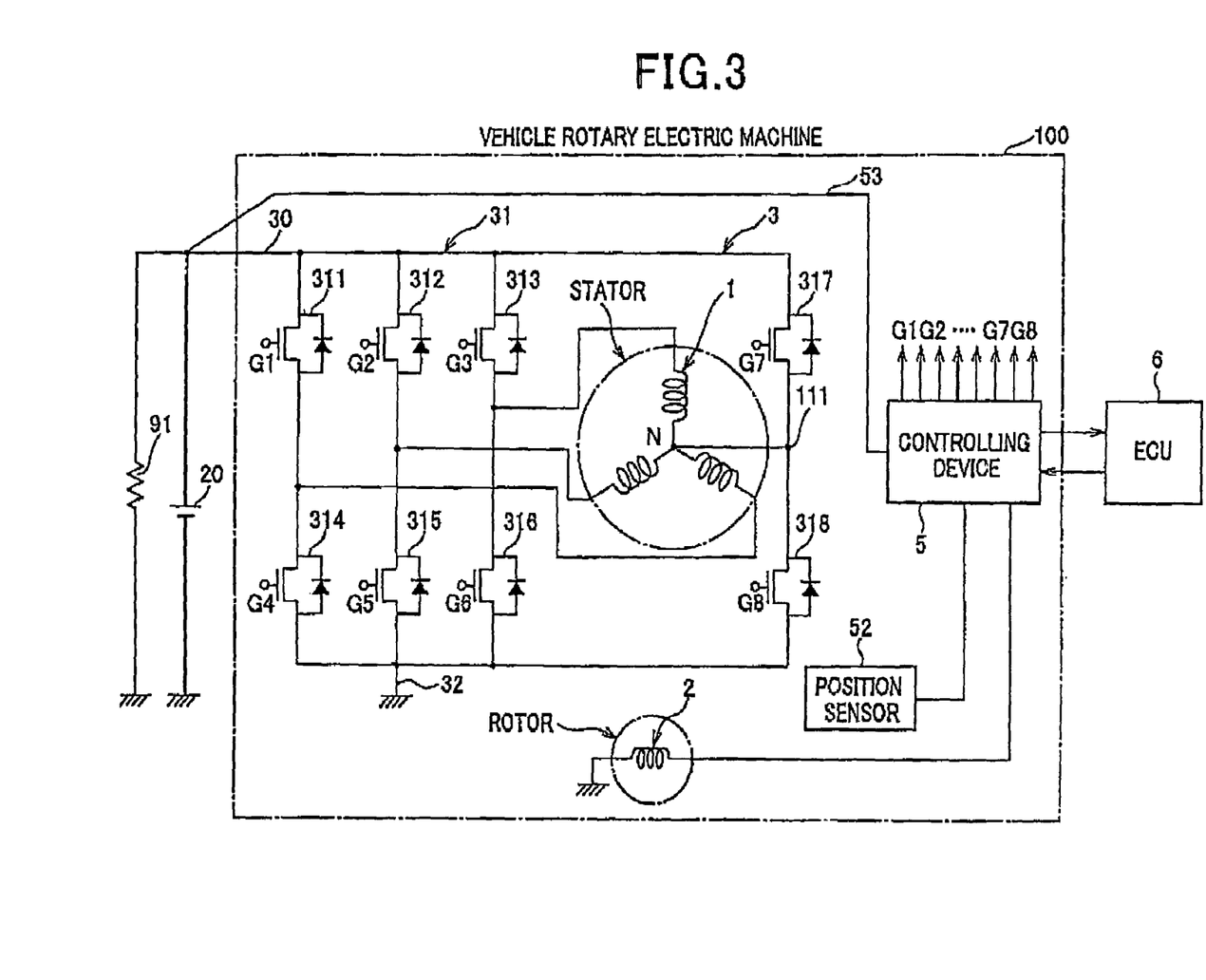
FIG. 3 is a connection wiring diagram showing an overall configuration of a vehicle rotary electric machine according to an embodiment of the present invention.

FIG. 3 is a connection wiring diagram showing an overall configuration of a vehicle rotary electric machine according to an embodiment. As shown in FIG. 3, the rotary electric machine 100 according to the present embodiment includes a three-phase winding 1, a field winding 2, a rectifying device 3, and a controlling device S. The three-phase winding 1 serves as a multi-phase winding included in a stator. The field winding 2 is included in a rotor. The three-phase winding 1 is wound around a stator core (not shown) at a pitch of 180 electrical degrees equivalent to an amount for a single magnetic pole of the rotor in which the field winding 2 is provided. Each phase winding is connected by a Y-connection. Three output terminals (winding terminals) of each phase of the three-phase winding 1 and a neutral point N are connected to the rectifying device 3.

The rectifying device 3 includes eight switching elements including a transistor and a diode connected between a source and a drain of the transistor. Specifically, three high-side (i.e., higher electrical potential side) winding-end switching elements 311 to 313 are disposed between winding ends of each phase of the three-phase winding 1 and a high potential end 30. Three low-side (i.e., lower electrical potential side) winding-end switching elements 314 to 316 are disposed between the winding ends of each phase and a low potential end 32. As a result, a three-phase full-wave rectification bridge 31 is configured. At the same time, an output terminal 111 is also drawn from the neutral point N. A high-side neutral point switching element 317 is disposed between the output terminal 111 and the high potential end 30. A low-side neutral point switching element 318 is disposed between the output terminal 111 and the low potential end 32. According to the present embodiment, a low-loss metal-oxide semiconductor field-effect transistor (MOSFET) is used in each switching element. In each switching element, the controlling device 5 serving as a rectification controlling section generates a control signal to be inputted into a gate, and conduction control (e.g., intermittent control) is performed.

The rectifying device 3 is connected to an external battery 20 and an electrical load 91. When the rotary electric machine 100 performs a power generating operation, a charging current and an operating current are supplied to the battery 20 and the electrical load 91 from the rectifying device 3. On the other hand, when the rotary electric machine 100 performs a motor operation, a motor-driving current required for the motor operation is supplied to the rectifying device 3 from the battery 20.

The controlling device 5 is respectively connected to an external electronic controlling unit (ECU) 6, a position sensor 52, and a voltage sensor 53 (in FIG. 3, a connection line introducing a terminal voltage from the battery 5 to the controlling device 5 is simply shown as the voltage sensor 53). The position sensor 52 detects the rotation position of the rotor. The voltage sensor 53 detects the terminal voltage of the battery 20. Based on signals inputted from the ECU 6, the position sensor 52, and the voltage sensor 53, the controlling device 5 decides the control mode, inputs a control signal into each switching element, and supplies the field winding 2 with a field current.

According to the present embodiment, the rotary electric machine 100 can be operated in two types of control modes. One is multi-phase full-wave rectification mode in which the rectifying device 3 operates with only the high-side winding-end switching elements 311 to 313 and the low-side winding-end switching elements 314 to 316. The other is neutral point rectification mode in which the rectifying device 3 operates including the low-side neutral point switching element 318 or the high-side neutral point switching element 317. Either the high-side winding-end switching elements 311 to 313 or the low-side winding-end switching elements 314 to 316 are selected as a different electrical potential side from the neutral point switching elements 318 or 317.

Detailed operations in each control mode will be described hereafter

A signal indicating whether to operate the rotary electric machine 100 as the generator to generate power or as the motor is sent from the ECU 6 to the controlling device 5. When generating power, the rotary electric machine 100 forms an NS (North and South) pole by sending an electric current to the field winding 2 in the rotor. As a result of rotating the NS pole on an inner circumferential side of the stator, the rotary electric machine 100 generates an alternating current in the three-phase winding 1 by electromagnetic induction. The rotary electric machine 100 converts the alternating current to a direct current using the rectifying device 3 and supplies the output to an external destination. When motor-driving, the rotary electric machine 100 forms an NS pole by sending an electric current to the field winding 2 in the rotor. The rotary electric machine 100 also converts a direct current applied from the battery 20 to an alternating current using the rectifying device 3 and sends the current to the three-phase winding 1. The rotary electric machine 100 creates a rotating field and rotates the rotor.

Figure 4:
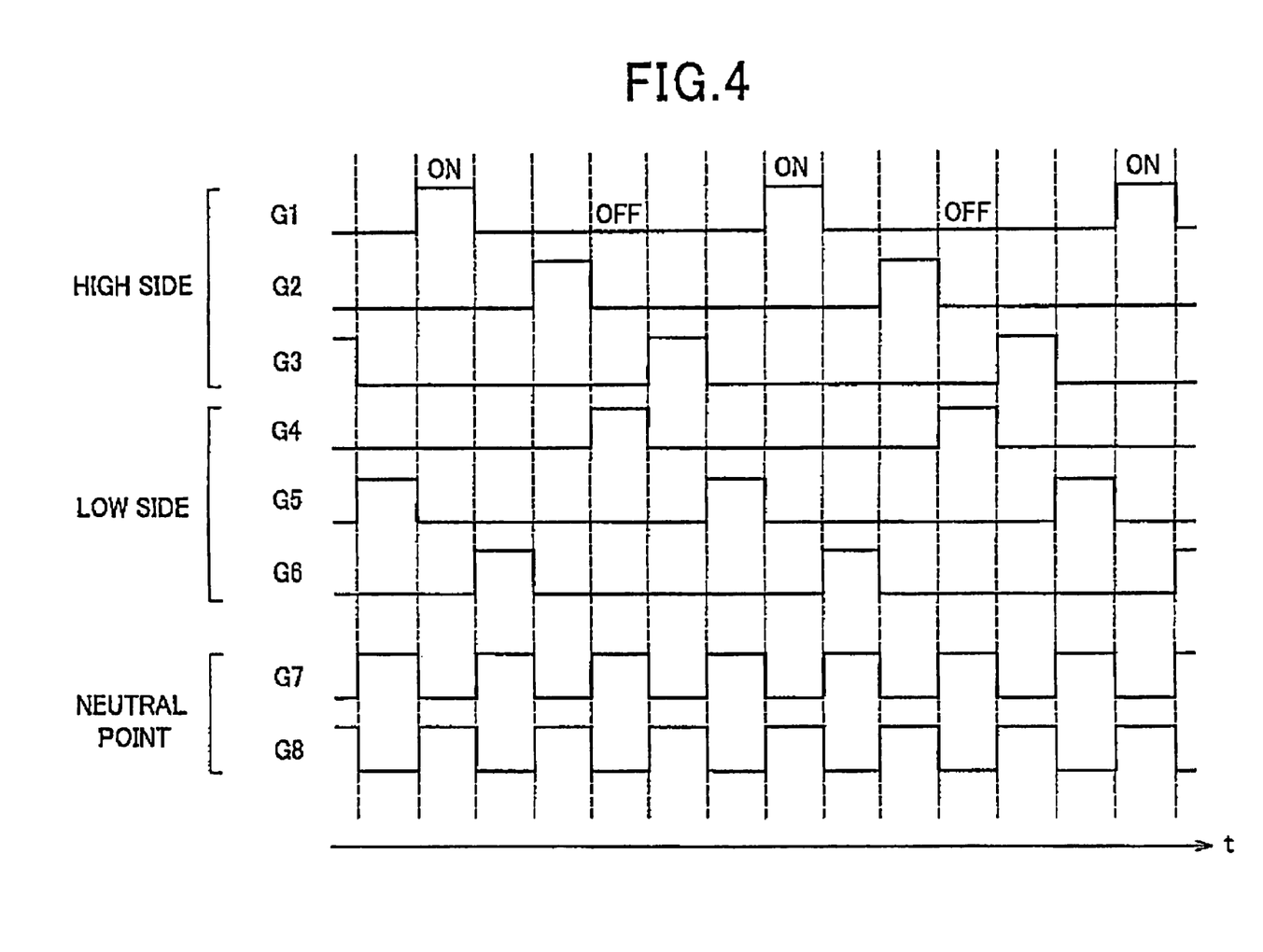
FIG. 4 is a diagram showing an operating state of each switching element in neutral point control mode.
Figure 5:
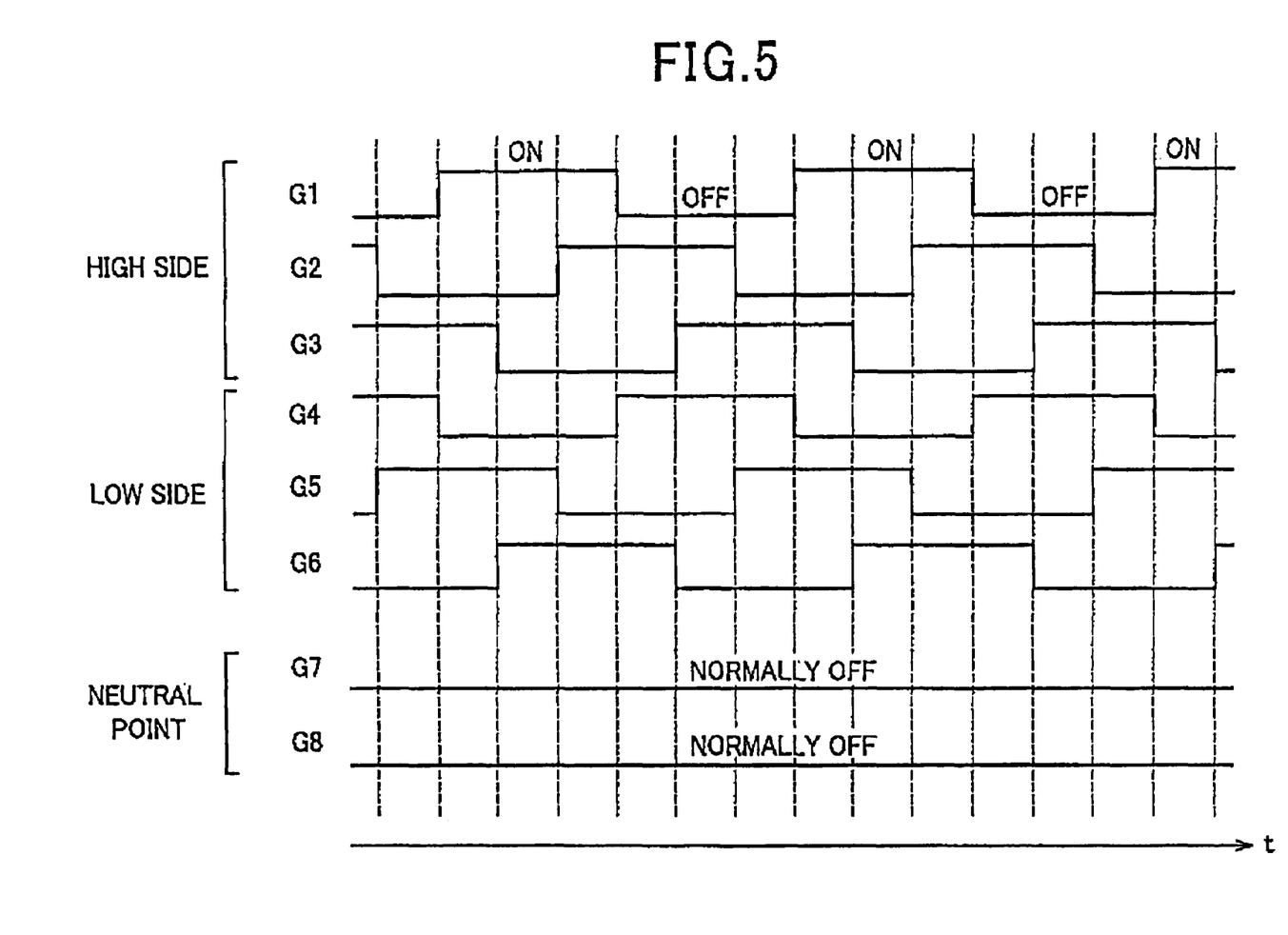
FIG. 5 is a diagram showing an operating state of each switching element in multi-phase full-wave rectification control mode.

The rotary electric machine 100 according to the present embodiment is configured as described above. Next, operations thereof will be described. FIG. 4 is a diagram showing an operating state of each switching element in neutral point control mode. FIG. 5 is a diagram showing an operating state of each switching element in multi-phase full-wave rectification control mode. In the diagrams, G1 to G3 indicate control signals inputted into respective gates of the high-side winding-end switching elements 311 to 313. G4 to G6 indicate control signals inputted into respective gates of the low-side winding-end switching elements 314 to 316. G7 indicates a control signal inputted into a gate of the high-side neutral point switching element 317. G8 indicates a control signal inputted into a gate of the low-side neutral point switching element 318. When the control signals are at high level (ON), the corresponding switching elements are set to the ON state. When the control signals are set to the low level (OFF), the corresponding switching elements are controlled at an OFF state. In FIGS. 4 and 5 and FIGS. 6 and 7 described hereafter, the horizontal axis is a temporal axis.

As shown in FIG. 5, in the multi-phase full-wave rectification mode, conduction of each switching element is controlled in a manner similar to common full-wave rectification. The high-side neutral point element 317 and the low-side neutral point element 318 are normally turned off and are not used.

At the same time, as shown in FIG. 4, in the neutral point control mode, each high-side winding-end switching element 311 to 313 and each low-side winding-end switching element 314 to 316 are controlled to have a phase difference of 120 electrical degrees to each other. A conduction interval is 60 degrees and is set such that other phases do not temporally overlap.

The high-side neutral point switching element 317 and the low-side neutral point switching element 318 are configured such as to switch between the ON state and the OFF state mutually exclusive of each other at a 60-degree interval.

The winding end switching elements and the neutral point switching elements are conduction-controlled such that one pair of switching elements with opposite polarity are always simultaneously in the ON state. A current path is formed such that an electrical current is outputted from or inputted into the neutral point N. When any of the high-side winding-end switching elements 311 to 313 is turned ON, the low-side neutral point switching element 318 is turned ON. On the other hand, when any one of the low-side winding-end switching elements 314 to 316 is turned ON, the high-side neutral point switching element 317 is turned on. The switching elements are controlled such that different electric potential end sides are always turned ON.

In the multi-phase full-wave rectification mode shown in FIG. 5, only the winding ends of the three-phase winding 1 are connected to the rectifying device 3 (because both the high-side neutral point switching element 317 and the low-side neutral point switching element 318 are normally in the OFF state). Therefore, as shown in an overview in FIG. 8, an electrical current always flows through two phases in the three-phase winding 1 (the current path is indicated by an arrow in FIG. 8). As a result, inductance of the three-phase winding 1 increases evenly. In theory, the increase is by $\sqrt{3}$-fold (about 1.7 folds) of the inductance of the winding of a single phase. On the other hand, in the neutral point rectification mode shown in FIG. 4, the rectifying device 3 is connected to both the winding ends of the three-phase winding 1 and the neutral point N. The electrical current is inputted and outputted through all switching elements. As shown in an overview in FIG. 9, control is performed such that the electrical current only flows through one phase in the three-phase winding 1 (the current path is indicated by an arrow in FIG. 9). Therefore, the inductance of the overall three-phase winding 1 becomes small. Excitation can be weakened without field weakening. Therefore, through selective use of the multi-phase full-wave rectification mode and the neutral point control mode, an optimal inductance can be selected in various operating modes, such as power generation and motor-driving, and high speed and low speed rotation.

For example, it is possible that the controlling device 5 switches between the multi-phase full-wave rectification mode and the neutral point rectification mode depending on a revolution speed of the rotor. As a result of the control mode being switched depending on the revolution speed, a control program can be simplified. Because power generation characteristics and motor torque characteristics are dependent on the revolution speed, more favorable characteristics can be achieved.

Also, it is possible that the controlling device 5 switches to the multi-phase full-wave rectification mode when the revolution speed is slower than a predetermined revolution speed, and switches to the neutral point rectification mode when the revolution speed is faster than a predetermined revolution speed. As a result, during power generation, inductance of the stator can be increased to enhance power generating capability when the revolution speed is slower than the predetermined revolution speed. On the other hand, when the revolution speed is faster than the predetermined revolution speed, the inductance can be reduced. Reaction can be reduced and high output can be achieved. During motor-driving, a high torque can be achieved by reducing the inductance when the revolution speed is faster than the predetermined revolution speed.

It is possible that the controlling device 5 switches between the multi-phase full-wave rectification mode and the neutral point rectification mode depending on whether the rotary electric machine 100 operates as the motor or the generator. In a conventional configuration, it is difficult to achieve favorable characteristics during power generation and motor-driving. However, the inductance can be equivalently changed in the present invention. Therefore, favorable characteristics can be achieved both during power generation and during motor-driving. Specifically, switching the controlling device 5 to the multi-phase full-wave rectification mode when the rotary electric machine 100 operates as the generator and switching to the neutral point rectification mode when the rotary electric machine 100 operates as the motor can be considered. As a result, during power generation, a high output can be achieved even at a low-speed revolution. During motor-driving, the inductance can be equivalently reduced. Therefore, simultaneous power generation and motor-driving, which was difficult in a vehicle generator, can be obtained.

In this way, in the rotary electric machine 100 of the present invention, because the neutral point rectification mode is provided in which rectification is performed using the high-side winding-end switching elements 311 to 313 or the low-side winding-end switching elements 314 to 316 and the neutral point switching element 318 or 317 with the differing electric potential. In this control mode, the electrical current enters and exits from the neutral point and only flows through the winding of one phase. Therefore, the inductance is only that of an amount for a winding of a single phase. In other words, a low-inductance winding can be achieved. In the rotary electric machine 100 of the present invention, the controlling device 5 can arbitrarily switch between two control modes. As a result, the controlling device 5 can change the inductance using the same three-phase winding 1. Therefore, only a single set of three-phase winding 1 is required. Size reduction, high output, and high efficiency can be actualized during power generation and high torque can be actualized during motor-driving at a low cost. Because characteristics can be arbitrarily changed by the control mode being switched, optimal power generation characteristics or motor torque characteristics can be achieved at any given time.

In the neutral point rectification mode shown in FIG. 4, a full-wave rectification is performed in which the high-side winding-end switching elements 311 to 313 and the low-side winding-end switching elements 314 to 316 are all periodically switched on and off. However, neutral point rectification mode corresponding to a half-wave rectification can also be used.

Figure 6:
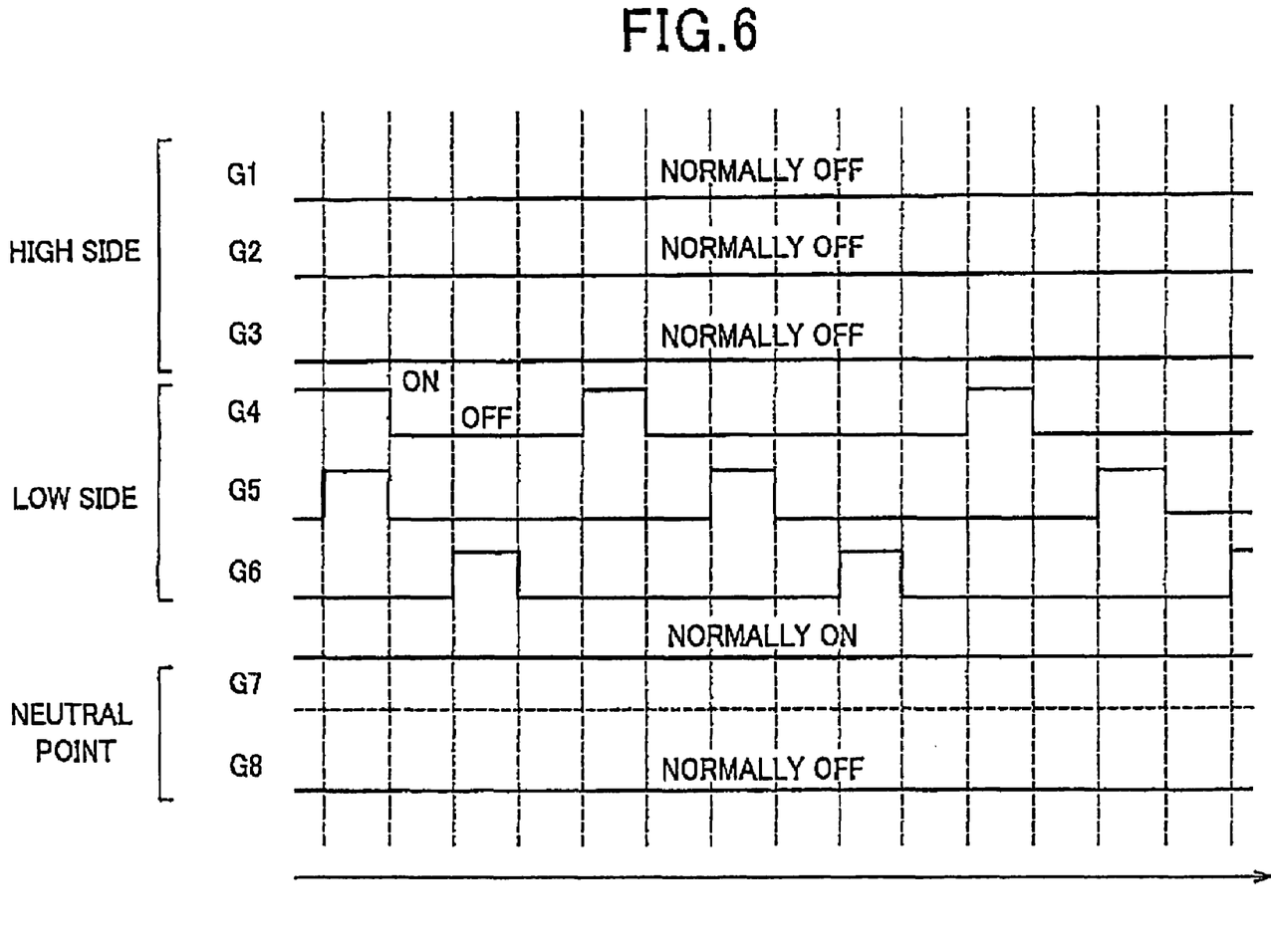
FIG. 6 is a diagram showing an operating state of each switching element in neutral point rectifying mode of a variation example corresponding to half-wave rectification.

FIG. 6 is a diagram of an operating state of each switching element in the neutral point rectification mode of a variation example corresponding to the half-wave rectification. In the neutral point rectification mode shown in FIG. 6, the high-side neutral switching element 317 is normally ON and the low-side winding-end switching elements 314 to 316 of a differing electric potential are s conduction-controlled. As a result of the rectifying device 3 performing a half-wave rectification operation in this way, the inductance of the three-phase winding 1 in the neutral point rectification mode can be further reduced.

Figure 7:
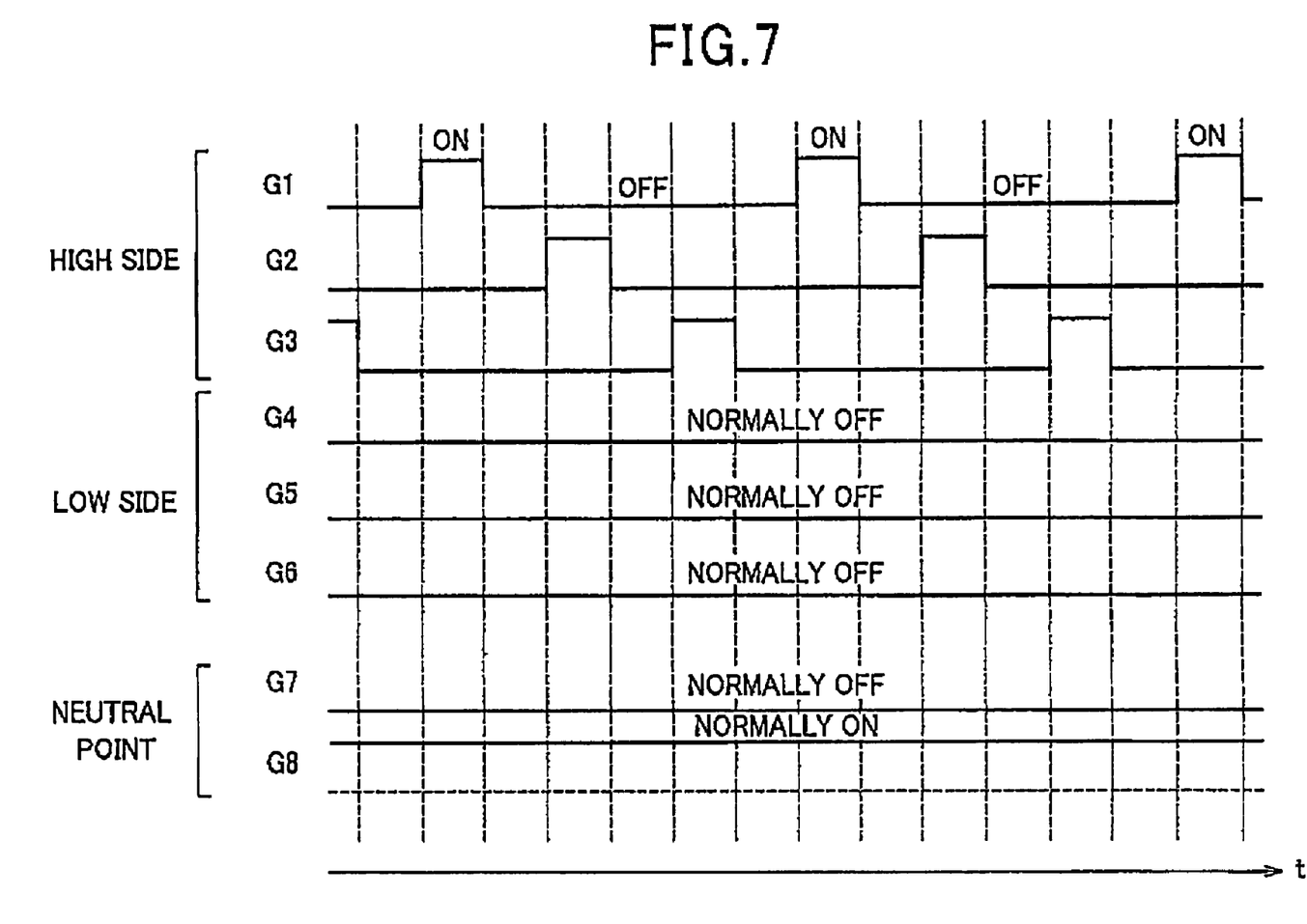
FIG. 7 is a diagram showing an operating state of each switching element in neutral point rectifying mode in another variation example corresponding to half-wave rectification.
Figure 8:
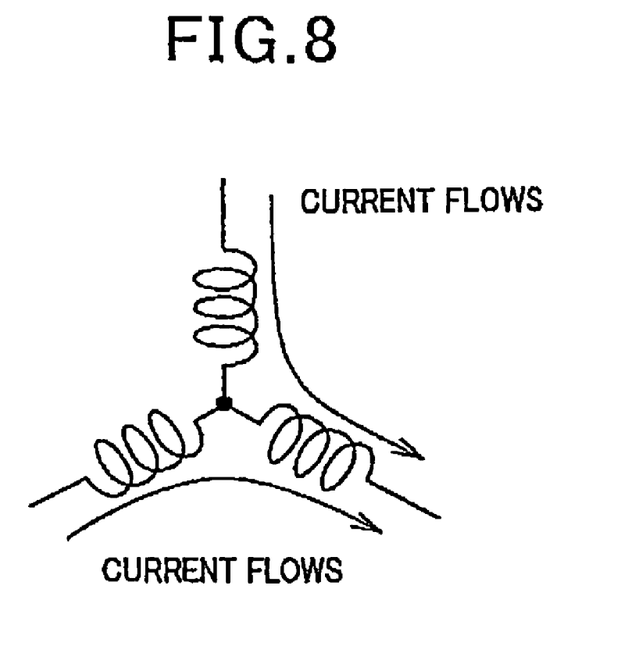
FIG. 8 is a diagram showing an overview of multi-phase full-wave rectification mode.
Figure 9:
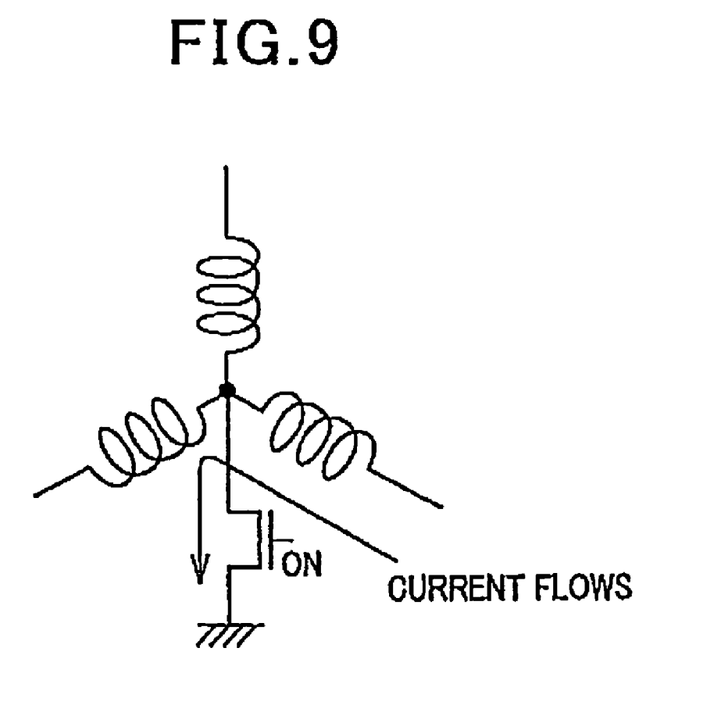
FIG. 9 is a diagram showing an overview of neutral point rectification mode.

FIG. 7 is a diagram of an operating state of each switching element in neutral point rectification mode of another variation example corresponding to the half-wave rectification. In the neutral point rectification mode shown in FIG. 7, the low-side neutral point switching element 318 is normally ON and the high-side winding-end switching elements 311 to 313 of a differing electric potential are conduction-controlled. In this instance as well, the inductance of the three-phase winding 1 in the neutral point rectification mode can be further reduced. In the neutral point rectification modes shown in FIG. 6 and FIG. 7, a conduction interval of each winding end switch is 60 degrees. However, the conduction interval can also be 120 degrees.

The present invention is not limited to the embodiment described above. Various medications can be made within a scope of the summary of the present invention. For example, according to the above-described embodiment, the rotary electric machine 100 including the three-phase winding 1 has been described. However, the present invention can be applied to a rotary electric machine including a multi-phase winding other than the three-phase winding.

What is claimed is:

1. A vehicle rotary electric machine including a rotor and a stator and operating as a motor and a generator mounted on the vehicle, comprising:
    multi-phase windings electrically connected to form a Y-connection that is wound in the stator;
    a converter that converts AC current flowing through the multi-phase windings from/to DC current flowing through at least a battery and being electrically connected to the battery and the multi-phase windings so as to intervene the battery and the multi-phase windings, the converter having a plurality of switching elements electrically connected to the multi-phase windings, the switching element comprising:
    a high-side switch connected between one end of each multi-phase winding and a high electric potential end of the converter,
    a low-side switch connected between one end of each multi-phase winding and a low electric potential end of the converter,
    a high-side neutral switch connected between a neutral point of the multi-phase windings at which the other ends of each winding are electrically connected together and the high electric potential end, and
    a low-side neutral switch connected between the neutral point and the low electric potential end; and a controller for controlling a current path of the multiphase windings by switching the switching elements on and off to perform
a first rectification mode and a second rectification mode, the controller controlling the switching elements to allow the high-side switch and the low-side switch to be on when the first rectification mode is performed, and controlling the switching element to allow either one of a pair of switches consisting of the high-side switch and the low-side neutral switch, or the low-side switch and the high-side neutral switch, to be on when the second rectification mode is performed.

2. The rotary electric machine according to claim 1, wherein the controller performs either the first or the second rectification mode depending on a revolution speed of the rotor.

3. The rotary electric machine according to claim 2, wherein the controller performs the first rectification mode when the revolution speed is slower than a predetermined revolution speed and performs the second rectification mode when the revolution speed is faster than the predetermined revolution speed.

4. The rotary electric machine according to claim 3, wherein the control device switches between the first and the second rectification mode depending on whether operation is performed as the motor or as the generator.

5. The rotary electric machine according to claim 3, wherein the control device switches to the first rectification mode when operation is performed as the generator and to the second rectification mode when operation is performed as the motor.

6. The rotary electric machine according to claim 2, wherein the control device switches between the first and the second rectification mode depending on whether operation is performed as the motor or as the generator.

7. The rotary electric machine according to claim 2, wherein the control device switches to the first rectification mode when operation is performed as the generator and to the second rectification mode when operation is performed as the motor.

8. The rotary electric machine according to claim 1, wherein the control device switches between the first and the second rectification mode depending on whether operation is performed as the motor or as the generator.

9. The rotary electric machine according to claim 8, wherein the control device switches to the first rectification mode when operation is performed as the generator and to the second rectification mode when operation is performed as the motor.

10. The rotary electric machine according to claim 1, wherein the control device switches to the first rectification mode when operation is performed as the generator and to the second rectification mode when operation is performed as the motor.

* * * * *